United States Patent [19]

Holmes et al.

[11] Patent Number: 5,365,269
[45] Date of Patent: Nov. 15, 1994

[54] ELECTRONIC CAMERA WITH AUTOMATIC IMAGE TRACKING AND MULTI-FRAME REGISTRATION AND ACCUMULATION

[75] Inventors: Alan W. Holmes; Mathew J. Iongmire, both of Santa Barbara, Calif.

[73] Assignee: Santa Barbara Instrument Group, Inc., Santa Barbara, Calif.

[21] Appl. No.: 964,775

[22] Filed: Oct. 22, 1992

[51] Int. Cl.⁵ .................. H04N 5/225; H04N 5/253; H04N 7/01
[52] U.S. Cl. .................................. 348/297; 348/294; 348/295; 348/143; 348/169
[58] Field of Search ............ 358/125, 211, 222, 105, 358/125, 211, 222, 109; 250/203.1, 203.6; 348/297, 294, 295, 143, 144, 169-172, 208, 215, 214; H04N 5/225, 5/253, 7/01

[56] References Cited

U.S. PATENT DOCUMENTS

| | | |
|---|---|---|
| 2,734,269 | 2/1956 | Claret . |
| 3,329,818 | 7/1967 | Woehl . |
| 3,502,387 | 3/1970 | Hadley . |
| 3,700,801 | 10/1972 | Dougherty .................. 178/6.8 |
| 4,133,004 | 1/1979 | Fitts .......................... 348/169 |
| 4,631,583 | 12/1986 | Paul ........................... 358/125 |
| 4,688,091 | 8/1987 | Kamel et al. ................ 358/109 |
| 4,847,603 | 7/1989 | Blanchard .................... 358/125 |
| 4,925,274 | 5/1990 | James et al. ................. 350/320 |
| 4,931,952 | 6/1990 | Hyder ......................... 358/125 |
| 4,958,224 | 9/1990 | Lepore et al. ................ 358/126 |
| 5,179,421 | 1/1993 | Parker et al. ................ 358/125 |
| 5,196,688 | 3/1993 | Hesse et al. ................. 358/125 |
| 5,196,929 | 3/1993 | Miyasaka ..................... 358/125 |

OTHER PUBLICATIONS

Charge-Coupled device (CCD) trackers for high accuracy guidance applications, Phil M. Solomon.
Vidicon Star Tracker, Walter H. Schuck.

*Primary Examiner*—Tommy P. Chin
*Assistant Examiner*—Vu Le
*Attorney, Agent, or Firm*—Koppel & Jacobs

[57] ABSTRACT

An optical image (54) of an astronomical scene is focussed by a telescope (16) onto a charge-coupled-device (CCD) photosensor array (50) to produce successive electronic pixel images (92) of the scene which are registered and co-added to produce an accumulated image (96) which is substantially free of streaking caused by rotation of the earth. A current image (92) is registered with an accumulated image (94) by sensing the coordinates of a selected bright star (90) in both images (92,94), computing the offset ΔI between the coordinates, and shifting the current image (92) by the offset ΔI prior to addition to the accumulated image. The telescope (16) may have a clock drive (24) to which the offset ΔI is also applied to correct for mechanical tracking errors.

17 Claims, 2 Drawing Sheets

ELECTRONIC CAMERA WITH AUTOMATIC IMAGE TRACKING AND MULTI-FRAME REGISTRATION AND ACCUMULATION

BACKGROUND OF THE INVENTION

1. Field of the Invention

The present invention generally relates to the art of electronic cameras, and more specifically to a charge-coupled-device (CCD) camera which is especially suited for low light level astrophotography.

2. Description of the Related Art

Photographs of astronomical scenes including the moon, planets, stars, galaxies and other celestial objects can be taken by a camera mounted at the primary focus of a telescope. An electronic camera using a CCD photosensor array as the photosensitive medium is highly preferred over a conventional camera which uses photographic film due to the CCD camera's much greater sensitivity, freedom from the tedious process of film processing and the ability to quickly display, modify and store electronic images using a computer. A photograph which requires hours of exposure time using photographic film can be taken by a CCD camera with an exposure time of several minutes.

If no compensation is made, an astronomical image which is focussed by the telescope onto the focal plane of the camera will move due to the rotation of the earth. For an exposure of more than approximately one second, the images of individual stars and other objects will appear elongated or streaked. For this reason, a motor or clock drive is commonly provided for moving the telescope in a path which is as closely opposite to the rotation of the earth as possible. This cancels the apparent motion of the image such that it appears stationary on the camera focal plane, and enables long exposures to be taken without streaking.

Although a clock drive can closely approximate the rotation of the earth, the mechanical tracking which it provides is never perfect. There are two general types of tracking errors. The first is periodic error in which the image on the camera focal plane appears to oscillate about a central point. This results from mechanical limitations in the gear mechanism of the clock drive. The second type of error is drift, and is caused by differences between the rotation rates of the earth and the clock drive and imperfect alignment between the earth and the axes of rotation of the telescope. The drift error results in streaking as described above, and accumulates over time. For example, doubling the exposure time results in twice as much drift and streaking.

Conventional clock drives are capable of producing images which are acceptably free of streaking for exposure times of approximately 30 to 60 seconds. For longer exposures, the astronomer must constantly monitor the view through the telescope and make manual drive corrections at intervals which are shorter than the maximum acceptable uncorrected drive time. This requires the astronomer not merely to be present during the entire exposure process, but to maintain concentration and diligence in constantly making small corrections.

This can become quite tedious for exposure times of an hour or more, and detract from the pleasure of astrophotography. It is clearly desirable to provide a feedback mechanism to automatically sense and correct tracking errors in the clock drive and enable unattended or "point and shoot" operation.

U.S. Pat. No. 4,958,224, entitled "FORCED CORRELATION/MIXED MODE TRACKING SYSTEM" issued Sep. 18, 1990 to R. Lepore et al discloses a method known as "video correlation tracking". A "live" image of a target which is being tracked and a "reference" image of the target are subjected to video correlation processing to determine the offset or registration error between the images caused by relative motion between the tracking optics and the target. A mechanical servomotor drive is adjusted by the amount of the computed offset to control the optics to track the target. The system disclosed by Lepore can also be operated in a "centroid" tracking mode, in which the offset between the live and reference images is determined by sensing and comparing the centroids of the two images.

A clock drive for astrophotography must move a telescope with much greater precision than is required for target tracking such as disclosed by Lepore. Gear backlash, inertia and other inaccuracies inherent in clock drives severely limit the precision which is attainable using video correlation or centroid processing to control a mechanical tracking drive. A system such as Lepore's if adapted for astrophotography would require an extremely large, accurate and expensive clock drive. This would place the system beyond the financial reach of most amateur astronomers, and would still produce only marginally clear images of faint objects in very deep space.

SUMMARY OF THE INVENTION

The present invention provides an electronic camera with automatic image tracking and multi-frame registration and accumulation, and a method of utilizing an electronic camera to produce an image of a moving scene.

More specifically, an optical image of an astronomical scene is focussed by a telescope onto a charge-coupled-device (CCD) photosensor array to produce successive electronic pixel images of the scene which are registered and co-added to produce an accumulated image which is substantially free of streaking caused by rotation of the earth.

A current image is registered with an accumulated image by sensing the coordinates of a selected bright star in both images, computing the offset between the coordinates, and shifting the current image by the offset prior to addition to the accumulated image.

The present electronic camera enables streak-free exposures of minutes or more to be taken without moving the telescope. If a clock drive is provided for moving the telescope, the offset is also applied to the clock drive to correct for mechanical tracking errors. This enables coarse tracking errors to be corrected by the clock drive and fine tracking errors to be corrected by image shifting, and maximizes the size of the final accumulated image.

Dual mode tracking in accordance with the present method enables exposures of several hours to be taken with high precision using a relatively inexpensive clock drive, and brings astrophotography of faint objects in deep space within the reach of amateur, as well as professional astronomers.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
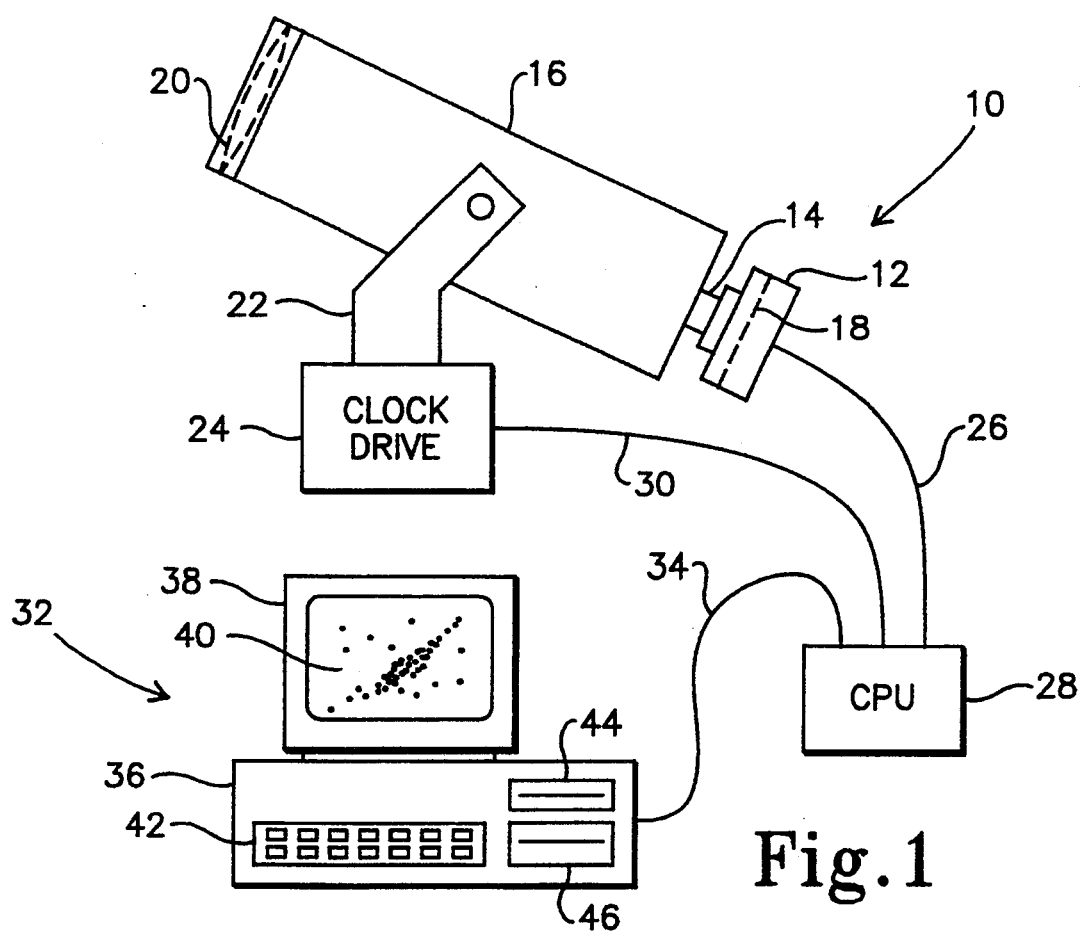
FIG. 1 is a simplified diagram illustrating an electronic camera embodying the present invention.

As illustrated in FIG. 1, an electronic camera 10 embodying the present invention comprises an optical head 12 which is attached to an eyepiece holder 14 of an astronomical telescope 16 such that a focal plane 18 of the optical head 12 lies at the focus of the telescope 16. An optical image of an astronomical scene which may include galaxies, nebulae, stars, planets, moons and/or other celestial objects is focussed onto the focal plane 18 by the optics of the telescope 16 which are symbolically illustrated by an objective lens 20.

The telescope 16 is supported by an adjustable mount 22 which enables it to be pointed at a selected area of the sky. Preferably, a motorized clock drive 24 is provided for mechanically moving the mount 22 and thereby the telescope 16 and optical head 12 in a path which is as closely opposite to the rotation of the earth as possible to cancel apparent motion of the image.

The optical head 12 is connected by a cable 26 to a central processing unit (CPU) 28 which is positioned near the telescope 16. The CPU 28 controls the clock drive 24 through a cable 30, and is also connected to a host computer 32 through a cable 34. The computer 32 may be a general purpose personal computer including a housing 36 in which a power supply and motherboard (not shown) are mounted, a video monitor 38 having a screen for displaying a visual image 40 generated by the computer 32, a keyboard 42 and disk drives 44 and 46.

Figure 2:
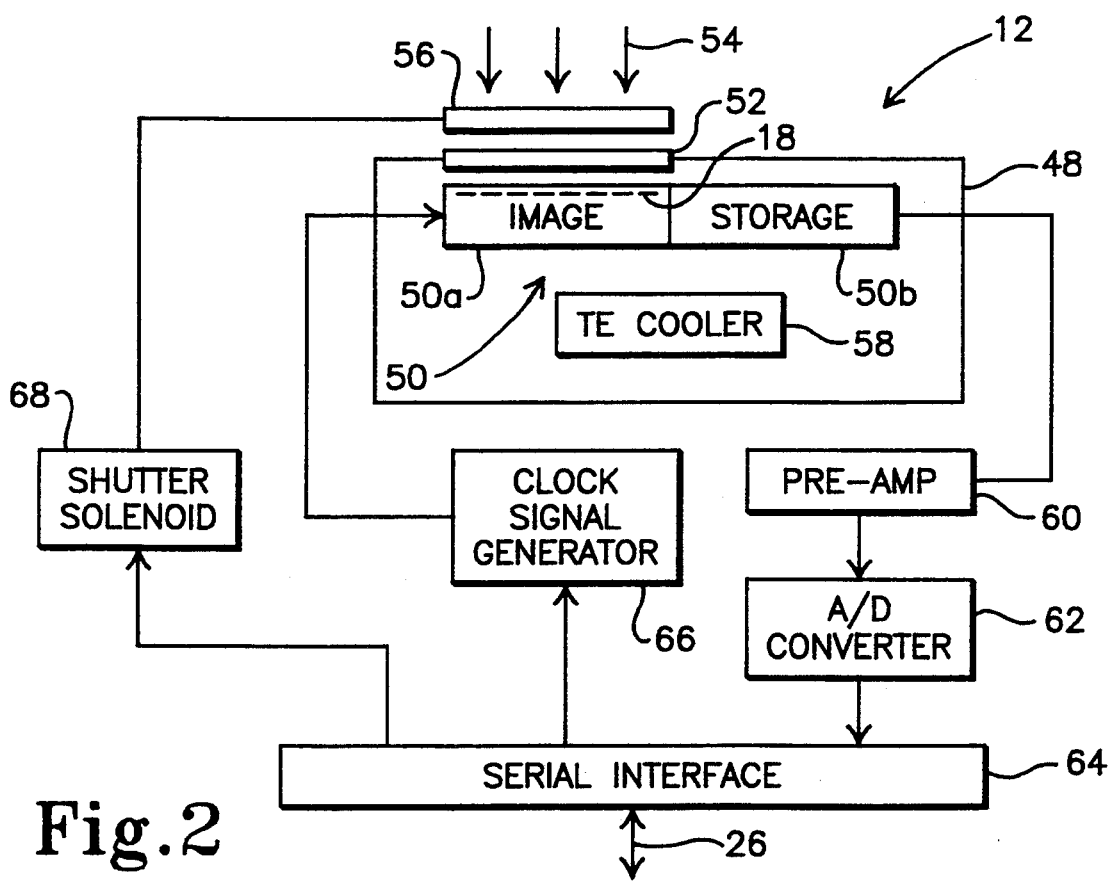
FIG. 2 is a block diagram illustrating an optical head of the present camera.

The optical head 12 is illustrated in FIG. 2, and includes a hermetically sealed housing 48 in which a photosensor array 50 is mounted. The array 50 is preferably a frame-transfer charge-coupled-device (CCD) photosensor array having an image area 50a and a storage area 50b. The focal plane of the array 50 coincides with the focal plane 18 of the optical head 12.

CCD photosensor arrays suitable for practicing the invention are commercially available. An example is the Texas Instruments 780-×488-PIXEL CCD IMAGE SENSOR TC241 which produces an 8.6×6.5 millimeter image having a resolution of 375×242 pixels. The TC241 is used as the array 50 in the MODEL ST-6 PROFESSIONAL CCD IMAGING CAMERA which embodies the present invention and is manufactured and sold by the Santa Barbara Instrument Group (SBIG) of Santa Barbara, Calif.

An optical image is focussed by the telescope 16 onto the focal plane 18 of the array 50 through a transparent window 52 as indicated by arrows 54. A mechanical shutter 56 is provided for selectively blocking and unblocking the window 52. The storage area 50b is permanently blocked and maintained in a darkened state by a metallization layer (not shown) which is an integral part of the array 50. A thermoelectric cooler 58 is mounted in the housing 48 for cooling the array 50 and minimizing the dark current thereof.

The image area 50a of the array 50 generates a pixel image corresponding to the optical image 54 which is transferred to the storage area 50b. A pre-amplifier 60 conditions and scales the signal produced by converting charge in the storage area 50b to an analog voltage, which is then converted to a digital signal by an analog-to-digital converter 62. The output of the converter 62 is applied to the CPU 28 through a serial interface 64 and the cable 26.

The optical 12 head also includes a clock signal generator 66 which produces the required clock signals for the array 50, and a shutter solenoid 68 for actuating the shutter 56. The converter 62, clock signal generator 66 and shutter solenoid 68 are controlled by the CPU 28 through the cable 26 and interface 64.

Figure 3:
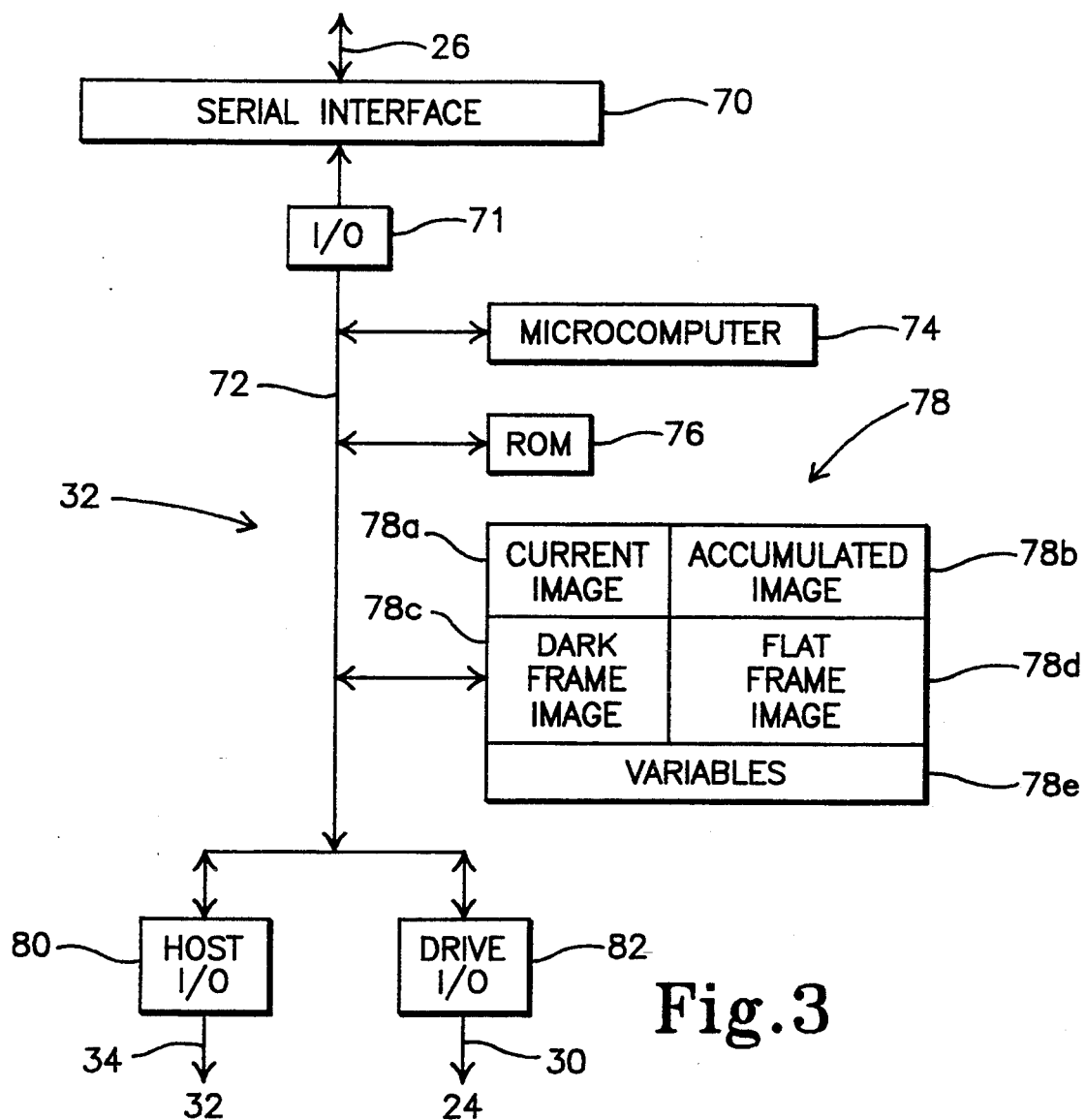
FIG. 3 is a block diagram illustrating a central processing unit of the camera.

The CPU 28 is illustrated in FIG. 3, and includes a serial interface 70 which communicates with the serial interface 64 of the optical head 12 via the cable 26. An input-output (I/O) unit 71 and a parallel bus 72 interconnect the interface 70 with a microcomputer 74, a read-only memory (ROM) 76 and a random-access memory (RAM) 78. The parallel bus 72 is also connected to a host I/O unit 80 which communicates with the host computer 32 via the cable 34, and a drive I/O unit 82 which controls the clock drive 24 via the cable 30.

The ROM 76 stores the operating program for controlling the operation of the optical head 12 and the CPU 28. The RAM 78 has an addressable current image area 78a, an accumulated image area 78b, a dark frame image area 78c, a flat frame image area 78d and a program and data storage area 78e. The host computer 32 controls the overall operation of the camera 10 by means of a software program which is provided in the form of, for example, a disk medium which can be read by the disk drive 44 or 46. Program routines can also be downloaded from the host computer 32 and stored in the area 78e of the RAM 78 for execution.

It is further within the scope of the invention to provide any or all of the current image area 78a, accumulated image area 78b, dark frame image area 78c and flat frame image area 78d in a RAM (not shown) of the host computer 32. For example, the current image area 78a, accumulated image area 78b and dark frame area 78c may be provided in the RAM 78 as illustrated in FIG. 3, and the flat frame area provided in the RAM of the computer 32.

The software program is loaded into the memory of the computer 32 and executed. Although it is within the scope of the invention to provide the overall operating program for the camera 10 as firmware in the ROM 76, the software embodiment is preferred since it enables the operating program to be revised, upgraded and modified for a particular application.

In operation, the telescope 16 is pointed at a selected area of the sky and focussed to form a sharp optical image of a scene including the desired celestial objects on the focal plane 18 of the CCD array 50. To produce a single electronic image or frame of the scene, the astronomer inputs the desired exposure time and other variables using the keyboard 42 of the host computer 32 and a command to take an exposure.

The image area 50a of the array 50 is first cleared of all accumulated charge. The shutter solenoid 68 then moves the shutter 56 to unblock the window 52, and the CCD photosensor elements of the image area 50a of the array 50 accumulate electrical charges in amounts corresponding to the local intensity of the incident light image 54 to form an electrical charge image consisting of pixels in the respective photosensor elements. When the exposure time has elapsed, the charge image is transferred from the image area 50a to the storage area 50b, and the image area 50a is again cleared in preparation for a subsequent exposure. The shutter solenoid 68 moves the shutter 56 to block the window 52 and prevent the photosensor elements of the image area 50a from accumulating excessive charge which could leak into the storage area 50b.

The charge image in the storage area 50b is converted to an analog voltage signal which read out and applied through the pre-amplifier 60 to the A/D converter 62 and converted to a digital image in which the brightness of each pixel is represented by respective digital number or word. The digital image is stored in the current image area 78a of the RAM 78 such that the digital number or word representing each pixel is stored at a respective addressable memory location in the area 78a.

The pixel image can be read out of the RAM 78 and displayed on the screen of the monitor 38, optimized using a variety of video processing algorithms, analyzed to determine the brightness of various objects, printed out to provide a hard copy, etc.

If the required exposure time is relatively short and/or the clock drive 24 is extremely accurate, a photograph can be taken using the clock drive alone as described above. However, the present invention enables unstreaked photographs of several minutes or more to be taken with an inaccurate clock drive, and if the field of view is sufficiently wide, even without a clock drive. The invention further enables photographs of up to several hours to be taken using an accurate clock drive 24 with a tracking accuracy which greatly exceeds that of the clock drive 24 alone. In addition, these long exposures can be taken without the astronomer being present to provide the desired "point and shoot" capability.

Figure 4:
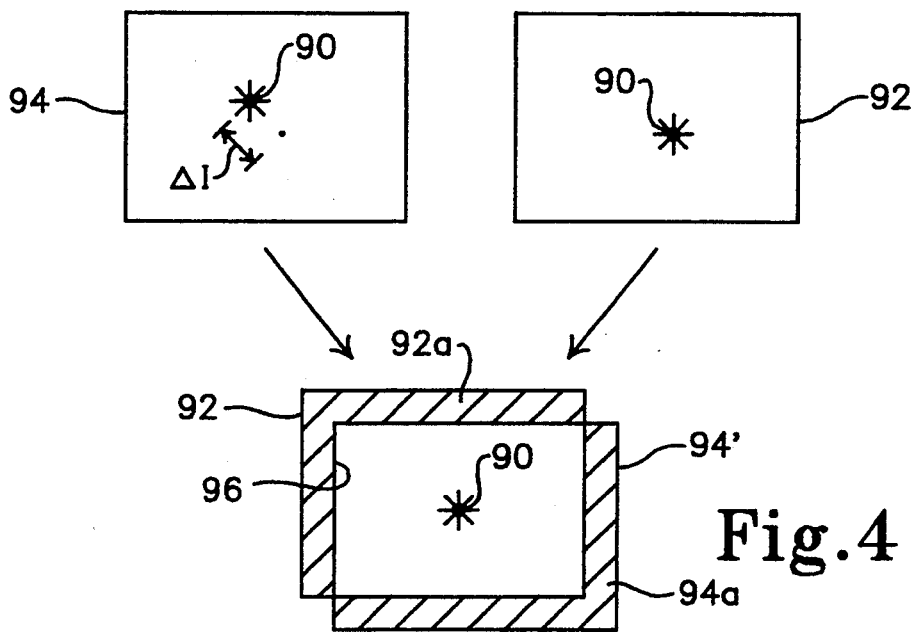
FIG. 4 is a diagram illustrating the image accumulation operation of the camera.

This is attainable in accordance with the present invention by shifting and co-adding successive multiple images or frames. As illustrated in FIG. 4, the astronomer selects a bright object such as an isolated single star 90 to serve as a "guide star". A first exposure of the selected astronomical scene is taken as described above to produce an electronic pixel image which is either stored directly in the accumulated image area 78b, or initially stored in the current image area 78a and subsequently transferred to the area 78b. The image stored in the accumulated image area 78b is designated as an accumulated pixel image 92.

Then, another exposure is taken of the scene, and a subsequent image, designated as a current pixel image 94, is stored in the current image area 78a. The microcomputer 74, under control of the program in the ROM 76 and/or storage area 78e of the RAM 78, reads out the image data stored in the current and accumulated image areas 78a and 78b respectively of the RAM 78 and performs digital image processing to determine the coordinates of the star 90 in the images 94 and 92. Due to rotation of the earth and/or tracking errors in the clock drive 24, the coordinates of the star 90 in the current image 94 will differ from the coordinates of the star 90 in the accumulated image 92 by an offset $\Delta I$.

Various algorithms can be used to determine the coordinates of the star 90, including centroid processing such as disclosed by Lepore. Another suitable algorithm is to scan the images 92 and 94 to determine the pixel in the image of the star 90 which has the highest brightness. In either case, a pixel in the image of the star 90 (centroid or brightest point) is used to compute the offset $\Delta I$.

The current image 94 is then shifted by the amount of the computed offset $\Delta I$ so that the star 90 in the current image 94 is registered with the star 90 in the accumulated image 92 as illustrated in the lower portion of FIG. 4. By performing this registration, all objects in the overlapping regions of the images 92 and 94 will also coincide with each other. The pixels of the shifted current image, designated as 94', are added to the respective pixels of the accumulated image 92, and the pixels in the overlapping area of the added image are stored in the accumulated image area 78b as a new accumulated image 96.

The current image 92 is electronically shifted by an amount corresponding to the offset $\Delta I$ by altering the memory addresses from which the current image 92 is read prior to addition. For example, it will be assumed that the offset $\Delta I$ is such that the sensed horizontal X and vertical Y coordinates of the pixel image addresses of the star 90 are $X=200$ and $Y=100$ in the accumulated image 92 and $X=192$ and $Y=105$ in the current image 94. The horizontal and vertical coordinates $\Delta X$ and $\Delta Y$ of the offset $\Delta I$ are thereby $\Delta X = -8$ and $\Delta Y = +5$.

The addresses $X'$ and $Y'$ from which the current image 94 is read from the area 78a will be altered such that $X' = X + \Delta X$ and $Y' = Y + \Delta Y$, whereas the addresses from which the accumulated image 92 is read out of the area 78b will be unaltered at X and Y. The pixels stored at the addresses $X'$ and $Y'$ in the current image 94 are added to the pixels stored at the addresses X and Y in the accumulated image, thereby shifting the current image 94 by the offset $\Delta I$. The co-added image 96 is then stored at the addresses X and Y in the area 78b.

Any desired number of images can be taken, registered and co-added in the manner described above. In each case, the most recent image is the current image 94 which is shifted and co-added to the accumulated image 92. The effects of tracking drift are minimized by taking a number of short exposures. For example, the tracking drift for a single long exposure is five times that for five exposures of 1/5 the time of the single long exposure.

However, the quality of an accumulated image consisting of many co-added images is slightly lower than that of a single long (perfectly tracked) exposure image or an image consisting of a smaller number of co-added images. If a clock drive is not provided, each exposure should be shorter than one second to prevent streaking. If a clock drive is provided, each exposure should be shorter than the acceptable drift time of the clock drive.

As illustrated in the lower portion of FIG. 4, the accumulated image 92 includes an L-shaped portion 92a which is indicated by hatching and does not overlap with the current image 94. The current image 94 has a corresponding non-overlapped portion 94a. The size or area of the co-added or new accumulated image 96 can be reduced by the areas of the portions 92a and 94a. This effect is maximum if a clock drive is not provided, since the image will continuously drift across the focal plane 18 due to the rotation of the earth and the overlap area of the images 92 and 94 to form the image 96 will continuously decrease.

For this reason, it is desirable to apply the offset correction to the clock drive 24 as a mechanical tracking error correction in addition to shifting the current image 94. Due to the mechanical limitations of the clock drive 24, the mechanical correction will probably not result in the star 90 being in exactly the same position in the focal plane 18 at the beginning of each exposure. However, it will be much closer than if the mechanical tracking correction were not performed. This minimizes the movement of the optical image on the focal plane 18 and the sizes of the non-overlapped image portions 92a and 94b, and maximizes the size of the co-added image 96.

The tracking error correction signal applied to the clock drive 24 is preferably proportional to the amount of the offset ΔI in the X and Y directions. However, it is within the scope of the invention to perform the tracking correction in other ways, for example by pulsing the clock drive 24 in the direction of the offset ΔI.

As mentioned above, several image processing techniques can be applied to clarify and increase the signal to noise ratio of the image 94 or 96. For example, if the array 50 is not exposed to light, a charge will slowly accumulate in the CCD photosensor elements due to dark current. Due to manufacturing tolerances, the accumulated charge will be slightly different for each element and produce an erroneous image pattern which is known in the art as "fixed pattern noise".

The effect of dark current can be removed from the image 94 or 96 by moving the shutter 56 to block the window 52 and allow the image area 50a of the array 50 to accumulate charge for a suitable length of time in the absence of light The resulting image, known as a "dark image frame" is transferred to the storage area 50b of the array 50 in the same manner as for producing a current image, and stored in the dark image storage area 78c of the RAM 78. The dark image frame is then subtracted from the accumulated image 94 or 96.

Since the fixed pattern noise varies relatively slowly over time, a single dark frame image can be stored and used for a large number of photographs. However, it is also possible to intersperse dark frame image exposure and subtraction with current image exposure and co-addition in the production of a single accumulated image where extremely precise results are required.

In addition to the fixed pattern noise caused by dark current, the photosensitivity of each CCD photosensor element in the image area 50a of the array 50 will vary due to manufacturing tolerances such that the elements will accumulate slightly different levels of charge in response to equal illumination. Optical vignetting and other effects created by the optics of the telescope 16 will cause an uneven distribution of illumination over the optical image 54. The effects of this type of aberration can be removed by producing a "flat frame image" of a wall or other object which is uniformly illuminated, storing this image in the flat frame image area 78d of the RAM 78 (or the RAM of the host computer 32), and multiplying the pixels of the image 94 or 96 by the reciprocal of the respective pixels of the flat frame image.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

We claim:

1. An electronic camera, comprising:
   optoelectronic sensor means for receiving a light image of a scene which moves continuously relative to the sensor means over a sensing interval, and for producing a periodically updated current electronic image corresponding to said scene at respective periodically updated current times over said sensing interval;
   image memory means for storing prior electronic images of said scene taken at respective times prior to a current time;
   offset sensor means for sensing an offset between a current image and its prior images corresponding to a relative movement between said scene and said sensor means during the time interval between the most recent of said prior times and the current time; and
   shift and accumulate means for electronically shifting each current image by said offset and adding each shifted current image to its respective prior images in registration therewith to produce an accumulated image of said scene that is substantially streak-free.

2. An electronic camera, comprising:
   optoelectronic sensor means for receiving a light image of a scene which moves continuously relative to the sensor means over a sensing interval, and for producing a periodically updated current electronic image corresponding to said scene at a current time over said sensing interval;
   image memory means for storing a prior electronic image of said scene taken at a time prior to the current time;
   offset sensor means for sensing an offset between said current image and said prior image corresponding to a relative movement between said scene and said sensor means during the time interval between said prior time and the current time; and
   shift and accumulate means for electronically shifting said current image by said offset and adding said shifted current image to said prior image in registration therewith to produce an accumulated image of said scene that is substantially streak-free;
   said current and prior images each comprising pixels;
   said image memory means comprising current memory means for storing said pixels of said current image at respective current addresses and accumulated memory means for storing said pixels of said prior image at respective accumulated addresses; and
   said shift and accumulate means comprising:
   shifting means for computing shifted current addresses by altering said respective current addresses by values corresponding to said offset; and
   accumulating means for reading and adding pixels stored at said shifted current addresses in the current memory means to pixels stored in said accumulated addresses in the accumulated memory means, and storing said added pixels at said accumulated addresses in the accumulated memory means.

3. An electronic camera as in claim 2, further comprising:
   a housing for supporting the optoelectronic sensor means;

drive means for moving the housing in a path which approximates a movement of said scene relative to said sensor means; and drive adjustment means for controlling the drive means to adjust said movement of the housing by an amount which produces a coarse registration of said current image with said prior image, with said offset sensor means sensing an offset between said current image and said prior image after said coarse registration, and said shift and accumulate means providing a fine registration of said current image with said prior image.

4. An electronic camera, comprising:

optoelectronic sensor means for receiving a light image of a scene which moves continuously relative to the sensor means over a sensing interval, and for producing a periodically updated current electronic image corresponding to said scene at a current time over said sensing interval;

image memory means for storing a prior electronic image of said scene taken at a time prior to the current time;

offset sensor means for sensing an offset between said current image and said prior image corresponding to a relative movement between said scene and said sensor means during the time interval between said prior time and the current time; and shift and accumulate means for electronically shifting said current image by said offset and adding said shifted current image to said prior image in registration therewith to produce an accumulated image of said scene that is substantially streak-free; free;

said current and prior images comprising pixels; and the offset sensor means comprising:

coordinate sensor means for sensing the coordinates of a selected pixel in said current and prior images respectively; and computing means for computing said offset as the difference between said sensed coordinates in said current and prior images respectively.

5. An electronic camera as in claim 4, in which the coordinate sensor means comprises means for sensing said coordinates of said selected pixel as being the coordinates of the centroids of a selected object in said current and prior images respectively.

6. An electronic camera as in claim 4, in which the coordinate sensor means comprises means for sensing said coordinates of said selected pixel as being the coordinates of the brightest pixels of a selected object in said current and prior images respectively.

7. An electronic camera as in claim 1, in which the optoelectronic sensor means comprises a charge-coupled-device (CCD) photosensor array.

8. An electronic camera, comprising:

optoelectronic sensor means for receiving a light image of a scene which moves continuously relative to the sensor means over a sensing interval, and for producing a periodically updated current electronic image corresponding to said scene at a current time over said sensing interval, said optoelectronic sensor means comprising a charge-coupled-device (CCD) photosensor array;

image memory means for storing a prior electronic image of said scene taken at a time prior to the current time;

offset sensor means for sensing an offset between said current image and said prior image corresponding to a relative movement between said scene and said sensor means during the time interval between said prior time and the current time;

shift and accumulate means for electronically shifting said current image by said offset and adding said shifted current image to said prior image in registration therewith to produce an accumulated image of said scene that is substantially streak-free; and means for subtracting a dark frame image produced by said photosensor array from said accumulated image.

9. An electronic camera, comprising:

optoelectronic sensor means for receiving a light image of a scene which moves continuously relative to the sensor means over a sensing interval, and for producing a periodically updated current electronic image corresponding to said scene at a current time over said sensing interval, said optoelectronic sensor means comprising a charge-coupled-device (CCD) photosensor array;

image memory means for storing a prior electronic image of said scene taken at a time prior to the current time;

offset sensor means for sensing an offset between said current image and said prior image corresponding to a relative movement between said scene and said sensor means during the time interval between said prior time and the current time;

shift and accumulate means for electronically shifting said current image by said offset and adding said shifted current image to said prior image in registration therewith to produce an accumulated image of said scene that is substantially streak-free; and means for multiplying said accumulated image by the reciprocal of a flat frame image produced by said photosensor array.

10. An electronic camera, comprising:

optoelectronic sensor means for receiving a light image of a scene which moves continuously relative to the sensor means over a sensing interval, and for producing a periodically updated current electronic image corresponding to said scene at a current time over said sensing interval;

image memory means for storing a prior electronic image of said scene taken at a time prior to the current time;

offset sensor means for sensing an offset between said current image and said prior image corresponding to a relative movement between said scene and said sensor means during the time interval between said prior time and the current time; and shift and accumulate means for electronically shifting said current image by said offset and adding said shifted current image to said prior image in registration therewith to produce an accumulated image of said scene that is substantially streak-free;

said optoelectronic sensor means comprising a frame transfer charge-coupled-device (CCD) photosensor array including an imaging area which is exposed to said light image for sensing said current image and a darkened storage area to which said current image is transferred from said imaging area.

11. A method of utilizing an electronic camera to produce an image of a scene which moves continuously relative to the camera over a sensing interval, comprising the steps of:

(a) operating the camera to produce periodically updated electronic images of said scene at respective periodically updated times over said sensing interval;

(b) electronically shifting each of said updated images into registration with the immediately preceding image; and (c) electronically adding each of said updated images to its respective prior images to produce an accumulated image of said scene that is substantially streak-free, 12. A method of utilizing an electronic camera to produce an image of a scene which moves continuously relative to the camera over a sensing interval, comprising the steps of:

(a) operating the camera to produce periodically updated electronic images of said scene at respective periodically updated times over said sensing interval;

(b) electronically shifting each of said updated images into registration with the immediately preceding image; and (c) electronically adding each of said updated images to its respective prior images to produce an accumulated image of said scene that is substantially streak-free.

step (c) comprising the substeps of:

(e) electronically sensing the offset between said first and second images; and (f) electronically shifting said second image relative to said first image by said offset.

13. A method as in claim 12, further comprising the steps of:

(g) mechanically moving said camera in a path which approximates a movement of said scene relative to the camera; and (h) adjusting said mechanical movement by an amount which produces a coarse registration of said second image with said first image;

wherein step (c) comprises electronically shifting said second image into a fine registration with said first image after said coarse registration step.

14. A method as in claim 12, in which step (e) comprises the substeps of:

(g) electronically sensing the centroid of a selected object in said first image;

(h) electronically sensing the centroid of said selected object in said second image; and (i) computing said offset as being the offset between said centroids of said selected object in said first and second images respectively.

15. A method as in claim 12, in which step (e) comprises the substeps of:

(g) electronically sensing the brightest point of a selected object in said first image;

(h) electronically sensing the brightest point of said selected object in said second image;

(i) computing said offset as being the offset between said brightest points of said object in said first and second images respectively.

16. A method of utilizing an electronic camera to produce an image of a scene which moves continuously relative to the camera over a sensing interval, comprising the steps of:

(a) operating the camera to produce periodically updated electronic images of said scene at respective periodically updated times over said sensing interval;

(b) electronically shifting each of said updated images into registration with the immediately preceding image; and (c) electronically adding each of said updated images to its respective prior images to produce an accumulated image of said scene that is substantially streak-free.

(e) operating the camera to produce a dark frame image; and (f) after performing step (d), subtracting said dark frame image from the sum of said first and second images.

17. A method of utilizing an electronic camera to produce an image of a scene which moves continuously relative to the camera over a sensing interval, comprising the steps of:

(a) operating the camera to produce periodically updated electronic images of said scene at respective periodically updated times over said sensing interval;

(b) electronically shifting each of said updated images into registration with the immediately preceding image; and (c) electronically adding each of said updated images to its respective prior images to produce an accumulated image of said scene that is substantially streak-free.

(e) operating the camera to produce a flat frame image; and (f) after performing step (d), multiplying the sum of said first and second images by the reciprocal of said flat frame image.

* * * * *

UNITED STATES PATENT AND TRADEMARK OFFICE
CERTIFICATE OF CORRECTION

PATENT NO. : 5,365,269
DATED : November 15, 1994
INVENTOR(S) : Alan W. Holmes; Matthew J. Longmire It is certified that error appears in the above-indentified patent and that said Letters Patent is hereby corrected as shown below:

Cover page, identification of inventors [75]: change "Iongmire" to --Longmire--.

Signed and Sealed this

Twenty-first Day of February, 1995

Attest:

BRUCE LEHMAN

Attesting Officer     Commissioner of Patents and Trademarks